United States Patent
Clifford

(10) Patent No.: US 6,696,164 B2
(45) Date of Patent: *Feb. 24, 2004

(54) STRUCTURAL PANEL AND METHOD OF MANUFACTURE

(75) Inventor: David D'Arcy Clifford, Caledonia (CA)

(73) Assignee: Dofasco Inc., Hamilton (CA)

( * ) Notice: Subject to any disclaimer, the term of this patent is extended or adjusted under 35 U.S.C. 154(b) by 0 days.

This patent is subject to a terminal disclaimer.

(21) Appl. No.: 10/067,908

(22) Filed: Feb. 8, 2002

(65) Prior Publication Data

US 2002/0086172 A1 Jul. 4, 2002

Related U.S. Application Data

(63) Continuation of application No. 09/618,075, filed on Jul. 17, 2000, now Pat. No. 6,419,774, which is a division of application No. 09/373,298, filed on Aug. 12, 1999, now Pat. No. 6,171,705, which is a continuation-in-part of application No. 09/342,690, filed on Jun. 29, 1999, now abandoned, and a continuation-in-part of application No. 08/947,030, filed on Oct. 8, 1997, now Pat. No. 5,985,457.

(60) Provisional application No. 60/038,816, filed on Feb. 10, 1997.

(51) Int. Cl.[7] .................................................. B32B 9/00
(52) U.S. Cl. .................... 428/464; 428/137; 428/411.1; 428/416; 428/457
(58) Field of Search .............................. 428/75, 411.1, 428/464, 416, 137, 414, 458, 481, 560, 457; 52/309.7, 309.9, 309.11

(56) References Cited

U.S. PATENT DOCUMENTS

| | | | |
|---|---|---|---|
| 1,943,757 A | 1/1934 | Delaney | 156/280 |
| 2,054,210 A | 9/1936 | Weisenberg | 156/209 |
| 2,545,603 A | 3/1951 | Byers et al. | 154/132 |
| 3,055,768 A | 9/1962 | Lassiter | 156/208 |
| 3,315,514 A | 4/1967 | Larsen | 72/363 |
| 3,674,619 A | 7/1972 | Scher et al. | 161/119 |
| 3,847,724 A | 11/1974 | Powers et al. | 161/161 |
| 4,123,305 A | 10/1978 | Krzeszowski | 181/208 |
| 4,188,248 A | 2/1980 | Millgardh et al. | 156/164 |
| 4,274,901 A | 6/1981 | Elber | 156/208 |
| 4,314,002 A | 2/1982 | Oizumi et al. | 428/414 |
| 4,416,949 A | 11/1983 | Gabellieri et al. | 428/461 |
| 4,588,458 A | 5/1986 | Previsani | 156/71 |
| 4,626,309 A | 12/1986 | Mullen, III et al. | 156/289 |
| 4,652,324 A | 3/1987 | Yamashina et al. | 156/242 |
| 4,673,606 A | 6/1987 | Unden et al. | 156/208 |
| 5,446,250 A | 8/1995 | Oka | 181/208 |
| 5,551,197 A | 9/1996 | Repp et al. | 52/204.62 |
| 5,985,457 A * | 11/1999 | Clifford | 28/416 |
| 6,171,705 B1 * | 1/2001 | Clifford | 428/464 |

FOREIGN PATENT DOCUMENTS

| | | |
|---|---|---|
| CA | 468763 | 10/1950 |
| CA | 655806 | 1/1963 |
| GB | 635823 | 4/1950 |
| GB | 1225500 | 3/1971 |
| JP | 84069 | 7/1978 |
| JP | 57-140 156 | 8/1982 |
| JP | 57-140 157 | 8/1982 |
| JP | 15594 | 1/1984 |
| JP | 63-067 142 | 3/1988 |
| LU | 80594 | 8/1988 |
| WO | WO 91/18738 | 12/1991 |
| WO | WO 96/04441 | 2/1996 |
| WO | 96/23621 | 8/1996 |

OTHER PUBLICATIONS

Brochure, St. Regis Paper Company, Bullentin No. 2M 864 PD–106, published Aug. 1964.

Bubble Sheet Metal For Very Light–Weight Structures, contribution to SAE Congress 1997; Klaus W. Blumel, Friedrich Behr, Thyssen Stahl AG, Duisberg, Germany.

* cited by examiner

*Primary Examiner*—Deborah Jones
*Assistant Examiner*—Abraham Bahta
(74) *Attorney, Agent, or Firm*—Omar A. Nassif

(57) ABSTRACT

A fibrous core material is disposed between and bonded to metal skins to form a structural laminate having comparable strength to steel sheets of greater weight.

15 Claims, 1 Drawing Sheet

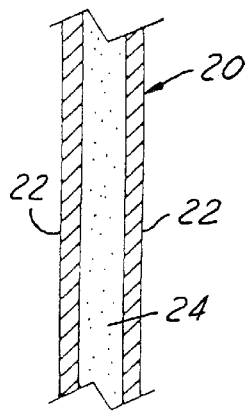
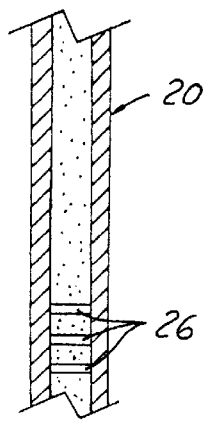
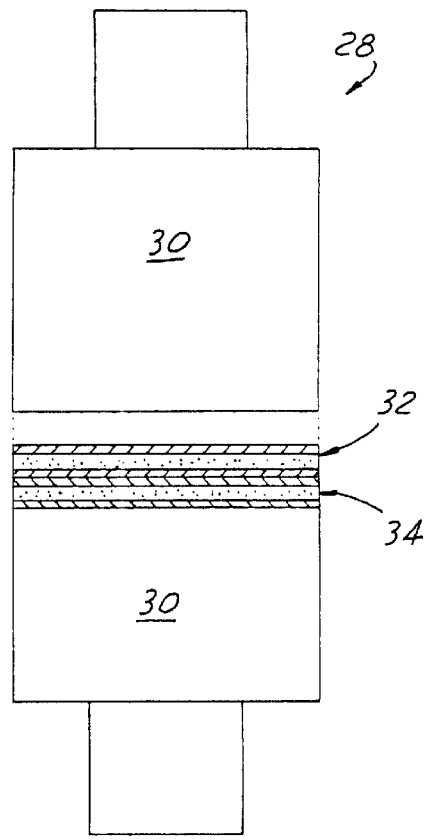
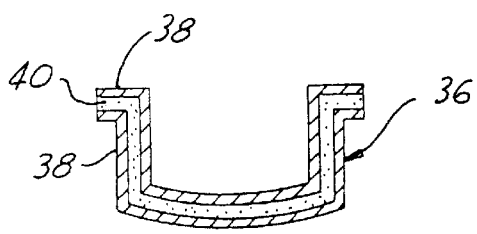
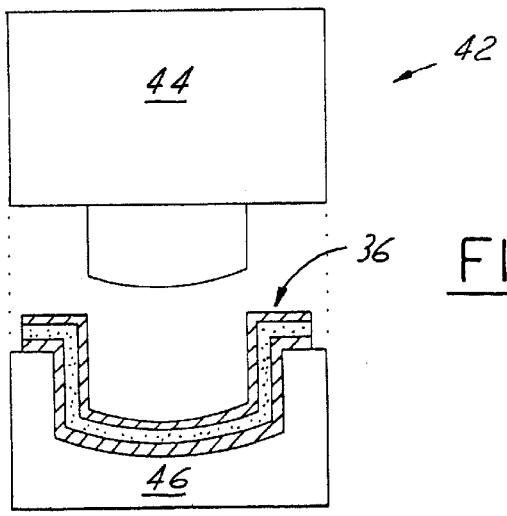
FIG. 1
FIG. 2
FIG. 3
FIG. 4
FIG. 5

STRUCTURAL PANEL AND METHOD OF MANUFACTURE

This application is a continuation of Ser. No. 09/618,075 filed Jul. 17, 2000 now U.S. Pat. No. 6,419,774 which is an divisional of Ser. No. 09/373,298 filed Aug. 12, 1999 now U.S. Pat. No. 6,171,705 which is a CIP of Ser. No. 09/342, 690 filed Jun. 29, 1999 now abandoned and a CIP of Ser. No. 08/947,030 filed Oct. 8, 1997 now U.S. Pat. No. 5,985,457 which claims the benefit of provisional application 60/038, 816 filed Feb. 10, 1997.

TECHNICAL FIELD

The present invention relates to laminate structural panels and, more specifically, to light-weight laminates having desirable structural characteristics.

BACKGROUND OF THE INVENTION

Sheet steel is used extensively to form panels. The required structural characteristics, such as stiffness, vary depending upon the specific application. When higher stiffness values are required, the steel thickness is typically increased. Increasing sheet steel thickness, however, produces a panel which is not only heavier, but also more expensive.

A number of approaches have been taken in the past to provide improved structural characteristics of panels, without substantially increasing weight or materials cost. For example, composites of steel sheets having a solid polymer core have been used in applications where sound deadening and vibration dampers are required. The specific stiffness of polymer core products, however, is less than desirable.

In copending U.S. patent application Ser. No. 08/947,030, filed Oct. 8, 1997, entitled STRUCTURAL PANEL WITH KRAFT PAPER CORE BETWEEN METAL SKINS now U.S. Pat. No. 5,985,457, the entire disclosure of which is incorporated herein by reference, structural panels are disclosed which are laminate structures having metals skins separated by and bonded to an intervening layer of paper. The laminates described therein have high specific stiffness.

In copending U.S. patent application Ser. No. 09/342,690, filed Jun. 29, 1999, entitled CARGO VEHICLE WALL, the entire disclosure of which is incorporated by reference, truck trailers having walls formed of laminates of metal skins and paper are described. The truck walls provide good structural characteristics while still minimizing weight and cost.

SUMMARY OF THE INVENTION

In one aspect a structural laminate is provided having first and second skins of sheet metal. Each of the sheet metal skins has a thickness of at least about 0.005 inches. A fibrous core layer is provided between the sheet metal skins and is bonded to the skins. In one aspect, the fibrous core layer is impregnated with an adhesive resin which bonds the core layer directly to the skins. In another aspect layers of adhesive are placed between the core material and the skins which bonds the core to the skins. The resulting laminate structure is extremely lightweight compared to a single steel sheet of comparable thickness and strength.

In one aspect, the fibrous core is paper and the metal skins are galvanized steel to provide corrosion resistance.

In still another aspect, the fibrous core layer has a plurality of channels extending between the metal skins. These transverse channels are filled with adhesive to create adhesive bridges that further bond the skins to the core.

In still another aspect of the invention, a method of forming a structural laminate is provided. The method includes the steps of placing a fibrous core material between two metal skins and applying pressure to the trilaminate to promote bonding between the core and the metal skins. In one aspect a number of trilaminates are prepared which are then stacked one upon another and are then pressed to simultaneously bond the individual layers.

In still another aspect, the present invention provides non-planar laminates and a method of making non-planar laminates. The method includes the steps of forming a laminate by placing a fibrous core between the metal skins, providing a means for bonding the core to the skins and forming the laminate into a non-planar object using metal forming techniques. In one aspect the metal forming technique utilized is a die press. In one aspect, heat is applied to the laminate either before, after or during the die press operation.

BRIEF DESCRIPTION OF THE DRAWINGS

FIG. 1 is a cross-section of the laminate of the present invention.

FIG. 2 is a cross-section of a laminate of the present invention, illustrating the use of adhesive channels.

FIG. 3 is a diagram depicting a press for bonding the individual layers into the inventive laminate.

FIG. 4 is a cross-section of the non-planar laminate of the invention.

FIG. 5 is a diagram depicting a die press forming the non-planar laminate of FIG. 4.

DETAILED DESCRIPTION OF THE PREFERRED EMBODIMENT OF THE INVENTION

Referring now to FIG. 1 of the drawings, panel 20 is shown having metal skins 22 and intervening fibrous core 24. It will be appreciated that panel 20 is essentially a trilaminate structure having three distinct layers which cooperate to form a functional unit. The properties of this functional unit are superior to that of its individual elements as will be more fully described herein.

One preferred construction of panels 20 in which paper forms the fibrous core is fully described in the aforementioned U.S. patent application Ser. No. 08/947,030 filed Oct. 8, 1997.

Referring again to FIG. 1 of the drawings, in one preferred construction, skins 22 are most preferably formed of zinc coated steel, with each layer 22 having a thickness of about 0.005 inch or greater, preferably from between about 0.005 inch and about 0.030 inch and more preferably from about 0.005 inch to about 0.012 inch in thickness. In one embodiment intervening fibrous layer 24 preferably has a thickness of from about 0.01 inch and greater and preferably from about 0.01 inch to about 0.05 inch. Thus, the overall thickness of panel 20 in one embodiment will typically be between about 0.020 inch and about 0.110 inch. A panel having the dimensions set forth above in the description of FIG. 1 of the drawings and having the preferred layer thicknesses just described will typically have weight that is about 40–70% of the weight of a single sheet of steel of comparable dimensions and stiffness.

The individual layers shown in FIG. 1 will now be described in more detail. As stated, metal skins 22 generally will be flat having planar surfaces on each side. Metals which may be utilized to form skins 22 are preferably selected from the group consisting of steel, aluminum, copper alloys and various combinations thereof. Metals which provide adequate structural and (if required) corrosion resistance properties in the specific environment in which panel 20 is used, at the lowest cost, are most desirable. Most preferable is zinc coated sheet steel.

As will be appreciated by those skilled in the art, steel comes in a number of grades based on the amount of carbon and other elements which it contains. Broadly these grades can be described as low carbon steel, medium steel and high carbon steel. Preferred for use herein are low carbon steel and low carbon micro-alloyed high-strength steel (HSLA). The most preferred metal skins for use in the present invention are cold rolled steel, galvanized steel, tin coated steel, and stainless steel. It may be desirable to utilize single sided galvanized sheet with a galvanized surface comprising the outer surface of skins 22 with the inner surfaces of the skins being bare metal for adhesion purposes. In one embodiment differential zinc coating is preferred, i.e. a light zinc coating on the inside surface and a heavier zinc coating on the outer surface. In one embodiment, zinc coated steel is cold rolled with zinc on the surface to the final thickness.

Layer 24 is a fibrous material. Although not wishing to be bound by any theory, it is believed that the fibrous nature of layer 24 may contribute to the desirable structural characteristics of panel 20, including resistance to delamination. As used herein, the term "fibrous," without limiting its scope in the context of the invention, is intended to mean a generally homogeneous collection of fibers, either natural or synthetic, which can be formed into a sheet product.

The most preferred fibrous material for use herein as layer 24, a material which is believed to be unique among fibrous sheets, is paper. As will be appreciated by those skilled in the art, paper is essentially a matted or felted structure of fibrous material formed into a relatively thin sheet through the medium of a dilute suspension of pulp and water. It is composed essentially of cellulose fibers. Pulp for paper making can be prepared by grinding wood or other plant matter mechanically, by chemical processing (sulfite, kraft, or soda) and also by chemically treating cotton, linen and hemp rags, waste, straw, and the like.

In the present invention, paper formed using the kraft process is most preferred. It will be appreciated by those skilled in the art that the (raft process (which may also be referred to as sulphate pulping or alkaline process) results in papers of high physical strength and bulk. One preferred paper is sold as saturating kraft paper, by Westvaco, of Charleston, S.C.

Also, as will be appreciated by those skilled in the art, the average alignment of cellulose fibers in paper is controlled somewhat by the "machine direction" during production of the paper. It is believed that in the present invention the orientation of the paper in the laminates is a factor which may affect the stiffness and strength of the laminate. Most preferred are laminates where the machine direction of the kraft paper is a line parallel to a neutral axis of bending of the laminate.

Another class of fibrous materials for use herein is plastic-fiber paper. Unlike paper, plastic-fiber paper is a collection of synthetic (i.e., synthetic polymer) fibers formed into a sheet. For example, it can be made from 100 percent high-density polyethylene fibers by spinning very fine fibers and then bonding them together with heat and pressure. Nylon paper, such as Nomex type 410, is produced from short fibers (floc) and smaller binder particles (fibrids) of a high-temperature-resistant polyamide polymer, formed into a sheet product.

In one preferred embodiment of the invention, layer 24 is provided as a resin-impregnated fibrous material. Where layer 24 is kraft paper, the paper is saturated with a resin which is then dried. Most preferred for use herein is phenolic resin-impregnated kraft paper. Polyester resin impregnation may also be suitable in some applications. Methods of impregnating paper with resin will be well-known to those skilled in the art. In essence, the preferred resin-impregnated paper is formed by immersing a substrate paper web in liquid phenolic resin. Typically, layers of saturated impregnated paper are layered together to form a single layer of semi-cured impregnated paper. One method of producing resin-impregnated paper is described in Canadian Patent No. 2,203,200 which issued Oct. 22, 1997. Other methods of impregnation include coating and spreading the resin on the paper. Although it may be suitable or desirable in specific applications to go beyond the ranges set forth hereinafter with respect to the resin content layer 24, in a preferred embodiment of the present invention resin constitutes from about 15% to about 45% by weight of resin-impregnated layer 24.

In most instances thermosetting resins are preferred for use in impregnating paper layer 24, although in some applications thermoplastic resins may be acceptable. In the case of thermosetting resins, as stated the resin will generally be cured to B-stage prior to forming panel 20, but it may be possible to fully cure the impregnated paper prior to the laminate pressing operation (controlled heat and pressure) described below. In the case of a phenolic resin, the resin is cured to B-stage prior to lamination. It is then fully cured as skins 22 and impregnated paper core 24 are laminated together using the press. It may be suitable in some applications to include a number of standard additives in the resin such as curing agents, fillers and the like.

With or without resin impregnation of fibrous layer 24, it may be desirable or required to use a layer of adhesive to bond skins 22 to fibrous core 24. A number of adhesives may be suitable in specific applications, including epoxies, phenolics, isocyanates, polyurethanes, and hot-melts. A particularly preferred adhesive for this purpose is a nitrile phenolic sold as "Arofene 1166" from Ashland Chemical. The adhesive may be applied directly to layer 24 or to metal skins 22 or both by any number of methods. It is preferred to pretreat the steel with a conversion coating such as a complex oxide or zinc phosphate to improve bond integrity and corrosion resistance.

In another embodiment, and referring now to FIG. 2 of the drawings, fibrous layer 24 of laminate 30' has a plurality of holes 26 extending therethrough. In some applications, holes 26 provide adhesive "bridges" as more fully described in the aforereferenced U.S. patent application Ser. No. 08/947,030.

Referring now to FIG. 3 of the drawings, one method of assembling skins 22 and layer 24 is shown using press 28. Press 28 includes platens 30 which move towards one another in the customary manner using hydraulics or the like. Platens 30 are preferably heatable so both heat and pressure can be applied to the laminates to cure the resin and bond the adhesive. More specifically, in FIG. 3 two metal/fiber/metal panels 32 and 34 are shown stacked upon each other. As stated above, the phenolic resin in layer 24 is at the B stage of cure prior to the press operation and heated platens 30 complete the cure of the phenolic resin during the pressing process. Also it is to be understood that while a single layer 24 is shown in the drawings, typically several sheets of fibrous material will be stacked on top of each other to build layer 24 up to the preferred thickness. In some applications it may be desirable to place a layer of adhesive between each sheet forming layer 24.

Referring again to FIG. 3 of the drawings, after a number of metal/fiber/metal laminates are stacked (preferably from 5–20), the press closes to apply pressure to the stack. The times, temperatures and pressures will vary widely depending upon thicknesses of skins 22 and layers 24, types of resin used to impregnate the central layer, and the type of adhesive used, if any, between the central layer and the metal skins. Most preferably, the temperature used should be adequate to cure the phenolic resin fully and assure bonding of the adhesive layers, if any. For phenolic resin impregnated paper the temperature is preferably between about 300° F. and 350° F. in a low pressure press, 25 to 400 psi and more preferably, 25 to 100 psi. The time required with these preferred temperatures and pressures in order to form securely bonded laminates typically will be between 15 and 60 minutes. That is, heat and pressure will be applied typically for a period within this range. After the pressed stack has cooled, it is removed from the press, individual panels are then separated.

In some applications, a sizing agent may be added to layer 24 to improve its resistance to water and to enhance inter-fiber bonding. Flame retardants such as those based on combinations of bromine, chlorine, antimony, boron and phosphorous may also be added to layer 24.

Turning now to FIG. 4 of the drawings, the method of forming non-planar laminate objects in accordance with the present invention will be explained. It will be appreciated that in some applications, the laminate panels of the present invention may substitute for a metal section which is not a flat sheet. Therefore, in one embodiment of the present invention provides a non-planar laminate 36. As used herein, the term "non-planar" shall mean a geometry other than a flat sheet (as is the laminate panel prior to the metal forming operation). Non-planar laminate 36 is shown for illustration purposes as a hat-shaped section having metal skins 38 bonded to opposite sides of fibrous core layer 40. The individual layers and their means of assembly into a trilaminate suitable for serving as a blank in the metal forming operation are the same as described above in connection with FIGS. 1 and 2 of the drawings.

In FIG. 5 of the drawings a simple die press 42 is shown having male (44) and female (46) die components. A planar metal/fiber/metal blank is placed on the female half of the die. The male die portion of the press is then used to form non-planar laminate 36 by closing press 42. In some instances, the individual layers (metal/fiber/metal) will be preassembled in the laminated state and used as a blank. In other instances, it may be suitable to form a stack of unbonded or partially bonded layers (i.e., metal/fiber/metal) which are then simultaneously bonded together or subsequently bonded together and formed to shape as they are pressed (with or without heat). It may also be suitable to partially bond the layers together with an adhesive having sufficient tack strength and then fully bond the laminate in the paint bake cycle.

While particular embodiments of this invention are shown and described herein, it will be understood, of course, that the invention is not to be limited thereto since many modifications may be made, particularly by those skilled in this art, in light of this disclosure. It is contemplated, therefore, by the appended claims, to cover any such modifications as fall within the true spirit and scope of this invention.

I claim:

1. A structural laminate comprising:

first and second skins of sheet metal, each of said skins having a thickness of at least about 0.005 in.;

a core, comprising a plurality of paper layers, each of the paper layers being impregnated with resin, disposed between said skins of sheet metal; and said core being bonded to said skins of sheet metal;

wherein said paper layers are disposed parallel to said skins.

2. The structural laminate recited in claim 1, wherein said sheet metal is selected from the group consisting of cold rolled steel, galvanized steel, tin-coated steel and stainless steel.

3. The structural laminate recited in claim 1, wherein said core is adhesively bonded to said skins of sheet metal.

4. The structural laminate recited in claim 1, wherein each of said skins has a thickness of from about 0.005 in. to about 0.030 in.

5. The structural laminate recited in claim 1, wherein said core has a thickness of at least about 0.01 in.

6. The structural laminate recited in claim 1, wherein said core has a thickness of at least about 0.01 in.

7. The structural laminate recited in claim 1, wherein said laminate is a structural panel.

8. The structural laminate recited in claim 1, further including layers of adhesive disposed between said core and each of said skins.

9. The structural laminate recited in claim 1, further including a plurality of channels extending through said core and extending between said metal skins.

10. The structural laminate recited in claim 9, wherein said channels are filled with adhesive to form adhesive bridges between said metal skins.

11. The structural laminate recited in claim 1, wherein said sheet metal skins are zinc coated steel which has been cold rolled with zinc on the surface.

12. The structural laminate recited in claim 1, wherein said laminate is non-planar.

13. The structural laminate recited in claim 1, wherein said metal skins are steel which has been pretreated with a conversion coating to promote bond integrity and corrosion resistance.

14. The structural laminate recited in claim 1, wherein said metal skins are formed of low carbon micro-alloyed high-strength steel.

15. The structural laminate recited in claim 1, further including a flame retardant in said core.

* * * * *